United States Patent Office 3,236,902
Patented Feb. 22, 1966

3,236,902
HALOGENATION OF SUBSTITUTED
POLYHALOCYCLOPENTADIENES
Hanswilli Von Brachel, Cologne-Sulz, Germany, assignor to Farbenfabriken Bayer Aktiengesellschaft, Leverkusen, Germany, a corporation of Germany
No Drawing. Filed Dec. 9, 1960, Ser. No. 74,777
Claims priority, application Germany, Dec. 15, 1959,
F 30,088
6 Claims. (Cl. 260—648)

The present invention relates to and has as its objects useful compounds with fungicidal activity and processes for producing same. The compounds of this invention may be represented by the following general formula:

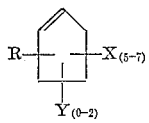

in which X stands for a halogen atom, R stands for an alkyl, cyclo-alkyl or aralkyl radical which furthermore may be substituted especially by halogen atoms and Y stands for hydrogen, halogen or another R-group.

In accordance with this invention it has been found that these alkyl-, cycloalkyl- and/or aralkyl-substituted polyhalo-cyclopentenes which are furthermore possibly halogenated in the substituents are easily obtained by reacting alkyl-, cycloalkyl- and/or aralkyl-substituted polyhalo-cyclopentadienes, if desired in the presence of diluents, with halogen under radical-forming conditions.

It was surprising that thereby only 1 mol of halogen is added and possibly further halogen only enters the substituent while retaining a double-bond in the cyclopentene-ring system. Furthermore it was also surprising that no decomposition of the carbon ring system occurs as when chlorination is carried out in the presence of aluminum chloride.

This process if desired may also be carried out in two steps whereby in the first step there are prepared from alkyl-, cycloalkyl- and/or aralkyl-substituted polyhalo-cyclopentadienes by treatment with halogen under radical-forming conditions (if desired in the presence of a diluent) the corresponding alkyl-, cycloalkyl- and/or aralkyl-substituted polyhalo-cyclopentenes. These then can be chlorinated in the second step according to the same process with the same or another halogen to form the polyhalo-cyclopentene halogenated in the substituents R of the above formula.

The two chlorinating reactions may also be carried out independently of one another.

As alkyl-, cycloalkyl- and/or aralkyl-substituted polyhalo-cyclopentadienes there may be used any cyclohalo-cyclopentadienes containing 2 to 5 halogen atoms and 1 to 3 alkyl, cycloalkyl or aralkyl groups. The alkyl, cycloalkyl or aralkyl groups themselves may also carry further functional groups such as halogen atoms, ether, ester or acetal substituents. Moreover, the cyclopentadiene nucleus itself may be substituted by one or two further alkoxy or phenoxy groups. The substituted cyclopentadienes may be obtained for example by reacting polyhalo-cyclopentadienes with tertiary esters of phosphorous acid and subsequent hydrolysis with water, alcohols, ammonia or amines.

As examples of alkyl-, cycloalkyl- or aralkyl-substituted polyhalo-cyclopentadienes which can be halogenated according to the process of the invention there may be mentioned: ethyl - pentachloro - cyclopentadiene, iso - propyl-pentachloro-cyclopentadiene, n-butyl-pentachloro-cyclopentadiene, n - decyl - pentachloro - cyclopentadiene, octadecyl - pentachloro cyclopentadiene, cyclohexyl - pentachloro-cyclopentadiene, diethyl-tetrachloro-cyclopentadiene, di-n-propyl-tetrachloro-cyclopentadiene, ethyl-propyl-tetrachloro-cyclopentadiene, di-isobutyl-tetrachloro-cyclopentadiene, triethyl - trichloro - cyclopentadiene, triethyl-trichloro - cyclopentadiene, (3 - oxabutyl) - pentachloro-cyclopentadiene, $\beta$ - phenyl - ethyl - pentachloro - cyclopentadiene, 2-(pentachloro-cyclopentadienyl)-propionic acid methyl ester, $\beta$-chloroethyl-pentachloro-cyclopentadiene, dimethoxy-ethyl-trichloro-cyclopentadiene, phenoxy-ethyl-pentachloro-cyclopentadiene, n-propyl-pentabromo-cyclopentadiene, di - n - butyl - tetrabromo - cyclopentadiene, ethyl-bromo-tetrachlorocyclopentadiene, n-butyl-difluoro - trichloro - cyclopentadiene and diethyl - bis(tetrachloro-cyclopentadienyl).

As examples of alkyl-, cycloalkyl- and/or aralkyl substituted polyhalo-cyclopentenes there are to be considered, besides the cyclopentenes produced by the addition of 2 halogen atoms to the above mentioned substituted polyhalo-cyclopentadienes, any substituted polyhalo-cyclopentenes, containing more than 3 halogen atoms and 1 to 3 alkyl, cycloalkyl and /or aralkyl radicals.

For the halogenation of the substituted polyhalo-cyclopentadienes and cyclopentenes there may be used e.g. chlorine and bromine, as well as sulfonyl-chloride, -bromide and the like.

As diluents, any organic solvents may be used which do not react with halogen under radical-forming conditions. Among these are for example carbon tetrachloride, hexachloroethane, carbon disulfide, glacial acetic acid and trichloroacetyl chloride.

The radical-forming conditions required for the reaction may be produced by irradiating the reaction mixture with the light of a strong electric lamp, any ultra-violet lamp or also sunlight. On the other hand, the addition of radical-forming catalysts such as azo-isobutyric acid dinitrile, azo-isobutyric acid methyl ester and benzoyl peroxide, may also be advantageous. The amounts of such radical-formers to be added depend on the desired degree of chlorination and in general lie between 0.01% and 5%, referred to the polyhalo compound used. In some cases it is also advantageous to use light and radical-formers simultaneously.

The halogenation process is carried out at temperatures between about —70° C. to 200° C., preferably —30° C. to 120° C. The cyclopentadienes and cyclopentenes to be reacted are used either undiluted or mixed with the solvents. For accelerating the reaction, hydrogen halide-acceptors such as sodium acetate may sometimes be added. The introduction of halogen may be effected continuously or by a single addition in the liquid, gaseous or dissolved state.

The amount of halogen depends on the composition of the starting product as well as of the desired final product. If only the first step of chlorination is carried out, about 0.8 to 1.2 mol of halogen, preferably about 1 mol, referred to the cyclopentadiene used, are employed. For the second step, the amount of halogen to be used only and wholly depends on the desired degree of halogenation to be achieved in the alkyl, cycloalkyl or aralkyl substitutents and the amount of halogen to be used may thus be chosen according to the aforesaid explanations.

The alkyl-, cycloalkyl- or aralkyl-substituted polyhalo-cyclopentenes or the alkyl-, cycloalkyl- or aralkyl-substituted polyhalo-cyclopentenes halogenated in the substituent may be freed from halogen or hydrogen halide in vacuo at an elevated temperature or by washing the products with water. Further purification may be carried out by distillation under vacuum or high vacuum, or by re-crystallisation or sometimes by chromatography.

The compounds of this invention are either uniform or mixed pale oils or solid substances which have besides their fungicidal action great technical importance as plasticisers which are light-resistant. They are furthermore flame-resistant and intermediate products for the manufacture of other pesticides and plastics.

It has been found that the aforementioned substituted polyhalo cyclopentene derivatives show especially an innertherapeutical or systemic action when used as fungicides, especially against the fungi causing yellow sickness which could not or only difficulty be combated as yet with commercial fungicides.

The activity of the inventive substituted cyclopentenes as systemic fungicides is especially surprising, because these compounds contain halogen and are insoluble in an aqueous medium and therefore their distribution in the plants could not be expected.

There are many advantages of the new fungicides in comparison with other commercial fungicides. As they are taken up by the plants, the influence of the weather does not effect them and they cannot be washed off as this is the case with fungicides which are only sprayed on the surface of the plants. Besides they reach every part of the plant, also the newly growing parts, because they are present in the system of the plants.

Thus they are especially active against the fungi of the yellow sickness against which an effective control was not possible so far. The pests of these plant-diseases, the fusariae or verticilliae, enter the plant-system through the roots where they spread out and their metabolism products effect poisioning by which the leaves turn yellow, the stem and leaves at last necrotisize, the growth stops and in many cases the plants are killed.

The following may illustrate the systemic action of the inventive substituted polyhalo cyclopentenes.

Tomato plants are planted in a Knop & Hoagland A–Z nutrient solution for 5–6 days and thereafter for 10 days in another Knop & Hoagland nutrient solution containing 0.005% of a compound described in Example A (I). The roots then are cut above the root-neck and the shoots are put again into the nutrient solution. After they had obtained new roots they were infested as described in Example A. 6% of the plants prepared in this way were attacked but all the control-plants which were treated with a pure nutrient solution were attacked. The plants which were not infested were not attacked at all.

According to their long lasting activity and the special kind of activity, the substituted polyhalo-cyclopentenes open new ways for combating pathogenic pests. Thus e.g. young plants can be immunized before they are planted into an infested medium.

Such an immunisation e.g. may be carried out by putting the plants with their roots, e.g. young tomato plants, into a solution containing the active ingredient for 6–10 days, before they are re-planted, or by putting carnation-shoots in sand which is saturated with aforesaid solution. It is useful to treat the plants again, before re-planting them, e.g. with a granulate or "wettable powder" of the active ingredient immediately after re-planting them. Thus the compounds of the present invention make it possible to protect plants for a long time from fungicidal attack.

Another possibility is to used the active ingredient for plants already infested. Heathy plants are especially protected if they are in the neighborhood of infested plants.

*Example A*

The test method and the evaluation was carried out on tomato plants according to the method of Diamond et al., 1952, Bull. 57, Connecticut Agric. Exp. Stat. New Haven.

The application was slightly modified by applying 100 ml. of the solution through the roots of each plant twice or three times before the infestation within an interval of 96 hours or twice before the infestation and 5 and 10 days after the infestation. Also the chemicals were mixed with the soil as wettable powders and given to the plants before the infestation. 20 to 25 days after the infestation the test was evaluated. The infestation was modified by using instead of suspensions of Fusarium oxysporum dry inoculum of the spores. The fungus was grown on a sand-maize-flour-mixture (90:90:10) during 6 days. In 500 ccm. Erlenmeyer-flasks 200 ml. of this mixture each were introduced and 40 ccm. distilled water were added. With this inoculum and soil a mixture of 1:10 was prepared and the plants were planted therein (450 ccm. soil-inoculum per pot). The infested plants were kept in the green-house at 25° C. and a relative humidity of 60 to 70%. During winter-time additional light has to be used.

The following table shows some inventive compounds which were tested specifically.

Starting-diene:        Approximate formula of the Chlorinating products (I) Ethyl-pentachloro-cyclopentadiene _____$C_5Cl_7C_2H_4Cl$
(II) n-Propyl-pentachloro-cyclopentadiene _____$C_5Cl_7C_3H_4Cl_3$
(III) n-Butyl-pentachloro-cyclopentadiene _____$C_5Cl_7nCH_5Cl_4$
(IV) Iso-propyl-heptachloro-cyclopentadiene _____$C_5Cl_7$—iso—$C_3H_3Cl_4$ To the compounds I–IV there were added the same amount of an oxethylated nonylphenol (NP 10) of mol 468 and 10 times their weight of acetone. This mixture was diluted with water to the concentration shown below.

| Compound | Concentration percent | Percent of damage (in percent of non-treated) |
| --- | --- | --- |
| I | 0.0125 | 1 |
| II | 0.0125 | 1.7 |
| III | 0.0125 | 1.7 |
| IV | 0.0125 | 0 |
| Control-test (non-treated) | | 100 |

*Example B*

0.06 g. of I (see foregoing example) were mixed with 10 g. of talc and further mixed with 450 ccm. of soil. 0.375 g. of II were mixed with 15 g. of talc and further mixed with 750 ccm. of soil.

| Compound | Active ingredient per test | Time before infestation | Percent damage |
| --- | --- | --- | --- |
| I | 0.06 g. =0.0135% | 24 h. | 12 |
| | 0.06 g. | 7 days | 1 |
| | 0.06 g. | 15 days | 0 |
| | 0.06 g. | 21 days | 0 |
| II | 0.375 g. | 15 days | 3 |
| | =0.05% | | |
| | 0.375 g. | 21 days | 0 |
| | 0.375 g. | 27 days | 7 |

The following examples are given for the purpose of illustrating the preparations of the inventive compounds.

*Example 1*

Into 26.6 parts by weight of ethyl-pentachloro-cyclopentadiene (0.1 mol) prepared according to the following procedure, chlorine is introduced at 40° C. under the light of an ultra-violet lamp until the weight of the reaction product has increased by 7.1 parts by weight. The mixture is then first stirred at 80° C. under vacuum and then distilled under high vacuum. Ethyl-heptochloro-cyclopentene: B.P. 70–75° C./0.1–0.3 mm. Hg. Yield about 80% of the theoretical. In the ultraviolet spectrum the band typical of polyhalo-cyclopentadiene is not detectable at 320–325 m/μ. The substance however possesses a maximum at 230 m/μ (log. ε=3.89).

*Analysis.*—Calculated: C, 24.9%; H, 1.5%; Cl, 73.6%. Found: C, 24.3%; H, 1.3%; Cl, 74.4%.

166 parts (weight) of triethyl-phosphite (1 mol) are added dropwise to 273 parts by weight of hexachloro-cyclopentadiene (1 mol) at 10–20° C. while cooling during 1 hour and then stirring is continued for 2 hours. The completion of the reaction is followed by shaking a sample of 1 ml. for 10 minutes with 50 ccm. of water and 10 ccm. of pyridin and titration with n/10 sodium hydroxide. Then the mixture is heated to the boil with 2500 parts (volume) of water for 2 hours. The ethyl-pentachloro-cyclopentadiene separates as a heavy oil and the phosphoric-diethyl-ester solves. For purification the ethyl-pentachloro-cyclopentadiene is washed with water several times and distilled in vacuo. The phosphoric diethyl-ester may be obtained from the aqueous solution by evaporating in vacuo, if desired.

Boiling-point of the ethyl-pentachloro-cyclopentadiene 107–110° C./12–14 mm. $n_D^{20}$:. Yield: 240 parts of weight=93%.

*Analysis*—Calculated: C, 31.5%; H, 1.9%; Cl, 67.0%. Found: C, 30.6%; H, 1.8%; Cl, 67.4%.

Example 2

Into 56 parts by weight of n-propyl-pentachloro-cyclopentadiene prepared according to the procedure shown below, chlorine is introduced at 60° C. until about 35.5 parts by weight of chlorine are taken up. Subsequently, the product is heated to 80–100° C. under a water-jet vacuum in order to remove the excess chlorine. The reaction product is a thickly liquid oil whose ultra-violet spectrum has a maximum at $\lambda_{max}=229m/\mu(\log.\epsilon3.98)$. A compound with the cyclopentene ring system is thus again obtained. Three chlorine atoms have entered the propyl residue. The analysis corresponds to trichloropropyl-heptachloro-cyclopentene of the impirical formula $C_8H_4Cl_{10}$.

*Analysis*—Calculated: C, 21.1%; H, 0.9%; Cl, 78.0%. Found: C, 20.1%; H, 0.9%; Cl, 78.1%.

273 parts by weight of hexachloro-cyclopentadiene (1 mol) are added dropwise to 208 parts by weight of tri-n-propyl-phosphite (1 mol) while stirring thoroughly and under cooling to −5° C. to 0° C. during 1½ hours. Then the mixture is heated to 40–50° C. for 1 hour and hydrolized by boiling for two hours with 3000 parts (volume) of water. The non-propyl-pentachloro-cyclopentadiene separates together with the larger part of the phosphoric di-n-propyl-ester. The latter is taken up in a sodium-hydrogen-carbonate-solution. and may be obtained from this solution after the cyclopentadienes are separated, with hydrochloric acid. The insoluble oil is washed with water, dried and distilled. By distillation there are obtained 230 g. of n-propyl-pentachloro-cyclopentadiene. Yield 82% of the theoretical. B.P. 126° C./12 mm. and $n_D^{20}$: 1.5340.

*Analysis*—Calculated: C, 34.2%; H, 2.5%; Cl, 63.3%. Found: C, 35.2%; H, 2.8%; Cl, 61.7%.

Example 3

Into 26.6 parts by weight of ethyl-pentachloro-cyclopentadiene prepared as said above, chlorine is introduced first at 60° C., subsequently at 100 to 120° C. while irradiating with an ultra-violet lamp until 14 parts by weight have been taken up. Hydrogen chloride is then removed under vacuum at 100° C. The thickly liquid reaction product has a composition corresponding to the empirical formula $C_7H_3Cl_9$.

$$\lambda_{max}:230m/\mu(\log.\epsilon 4.02)$$

*Analysis*—Calculated: C, 20.8%; H, 0.74%; Cl, 78.5%. Found: C, 20.0%; H, 0.72%; Cl, 79.0%.

Example 4

59 parts by weight of n-butyl-pentachloro-cyclopentadiene prepared exactly as described in the foregoing examples are chlorinated first at 60° C., subsequently by at 100 to 120° C. until 43 parts by weight of chlorine are taken up, and freed from dissolved chlorine and HCl at 100° C. under vacuum. The reaction product is a clear, thickly liquid oil the anlaysis of which corresponds to the empirical formula $C_9H_5Cl_{11}$. $\lambda_{max}:226 m/\mu$ (log.$\epsilon$3.66).

*Analysis*.—Calculated: C, 21.8%; H, 1.0%; Cl, 77.5%. Found: C, 21.3%; H, 1.0%; Cl, 77.5%.

By the same way from the following compounds the chlorination products of the approximate formula shown thereafter are obtained:

Di-n-propyl-tetrachloro-cyclopentadiene
$C_5Cl_6(C_3H_5Cl_2)_2$

Tri-n-propyl-trichloro-cyclopentadiene
$C_5Cl_5(C_3H_4Cl_3)_3$ n-Decyl-pentachloro-cyclopentadiene
$C_5Cl_7(C_{10}H_{11}Cl_{10})$ Oleyl-pentachloro-cyclopentadiene
$C_5Cl_7(C_{18}H_{32}Cl_5)$ 3-oxabutyl-petachloro-cyclopentadiene
$C_5Cl_7(C_3H_3Cl_4O)$ β-Phenyl-ethyl-pentachloro-cyclopentadiene
$C_5Cl_7(C_8H_6Cl_3)$ Cyclohexyl-pentachloro-cyclopentadiene
$C_5Cl_7(C_6H_7Cl_4)$ Ethyl-pentabromo-cyclopentadiene
$C_5Br_5Cl_2(C_2H_3Cl_2)$ By the same way from the following compounds the bromination products of the approximate formula shown thereafter are obtained:

n-Propyl-pentachloro-cyclopentadiene
$C_5Cl_5Br_2(C_3H_7)$ n-Propyl-pentachloro-cyclopentadiene
$C_5Cl_5Br_2(C_3H_5Br_2)$ Iso-butyl-pentachloro-cyclopentadiene
$C_5Cl_5Br_2(C_4H_7Br_2)$ whereas some of the inventively used compounds are known, the most important group consisting of a class of new compounds not known as yet, may be represented by the following general formula:

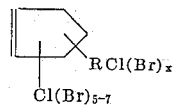

wherein the radical R stands for a lower alkyl or cycloalkyl group from 2 to 6 carbon atoms, or a phenyl lower alkyl group and X stands for a whole number up to about 20.

I claim:

1. A process for producing a member selected from the group consisting of haloalkyl- and halocycloalkyl-polyhalocyclopentenes, comprising reacting a member selected from the group consisting of alkyl-, haloalkyl-, cycloalkyl- and halocycloalkyl-substituted polyhalocyclopentadienes with at least 2 gram moles of a halogenating agent selected from the group consisting of chlorine, bromine, sulfonyl chloride and sulfonyl bromide under free-radical conditions; effecting the reaction at a temperature of about −70° C. to 200° C.; and recovering the resulting product.

2. A process of claim 1 wherein the reaction proceeds at a temperature of from about −30° C. to 120° C.

3. The process of claim 1 wherein the reaction is undertaken in the presence of an effective amount of actinic light.

4. The process of claim 1 wherein the reaction is undertaken in the presence of a catalytic amount of a member selected from the group consisting of azo-isobutyric acid dinitrile, azo-isobutric acid methyl ester, and benzoyl peroxide.

5. A process of claim 1 wherein the polyhalocyclopentadiene contains 2–5 carbon atoms and 1–3 substituent groups.

6. A process of claim 1 wherein a reaction-accelerating amount of sodium acetate is present in the reaction mixture.

References Cited by the Examiner

UNITED STATES PATENTS

| | | | |
|---|---|---|---|
| 2,569,131 | 9/1951 | Markarion | 260—650 |
| 2,904,599 | 9/1959 | Kleiman et al. | 260—648 |
| 2,945,893 | 7/1960 | Steinhofer et al. | 260—648 |
| 2,963,399 | 12/1960 | Bluestone | 167—30 |
| 2,967,125 | 1/1961 | Carlson | 167—30 |
| 2,981,755 | 4/1961 | Wiese | 260—648 |
| 2,981,756 | 4/1961 | Neureiter | 260—648 |

FOREIGN PATENTS 1,103,329   3/1961   Germany.

OTHER REFERENCES

Prins: "Recueil des Travaux Chimiques des Pays-Bas," vol. 72, pp. 253–61, 1953.

McBee et al.: "Jour. Am. Chem. Soc." vol. 77 pp. 4379–80, August 1955.

LEON ZITVER, *Primary Examiner.*

WILLIAM B. KNIGHT, ALPHONSO D. SULLIVAN, *Examiners.*